US007222196B2

(12) United States Patent
Asthana et al.

(10) Patent No.: US 7,222,196 B2
(45) Date of Patent: May 22, 2007

(54) APPARATUS, AND ASSOCIATED METHOD, FOR FACILITATING COMMUNICATION OF PACKET DATA IN A PACKET RADIO COMMUNICATION SYSTEM USING INTERACTIONS BETWEEN MID-STACK AND UPPER-LEVEL LAYERS

(75) Inventors: Sarvesh Asthana, San Diego, CA (US); Xiaodong (Andy) Chen, Hong Kong (HK)

(73) Assignee: Nokia Corporation, Espoo (FI)

( * ) Notice: Subject to any disclaimer, the term of this patent is extended or adjusted under 35 U.S.C. 154(b) by 526 days.

(21) Appl. No.: 10/744,950

(22) Filed: Dec. 22, 2003

(65) Prior Publication Data

US 2005/0147123 A1 Jul. 7, 2005

(51) Int. Cl.
*G06F 15/16* (2006.01)
*H04B 7/212* (2006.01)

(52) U.S. Cl. ...................... 709/250; 370/348
(58) Field of Classification Search ............... 709/250; 370/320, 322, 329–330, 342, 348
See application file for complete search history.

(56) References Cited

U.S. PATENT DOCUMENTS

| | | | | |
|---|---|---|---|---|
| 5,159,702 A | * | 10/1992 | Aratake | 455/464 |
| 5,634,006 A | * | 5/1997 | Baugher et al. | 709/228 |
| 6,201,791 B1 | * | 3/2001 | Bournas | 370/234 |
| 6,415,410 B1 | * | 7/2002 | Kanerva et al. | 714/749 |
| 6,526,281 B1 | * | 2/2003 | Gorsuch et al. | 455/452.1 |
| 6,542,481 B2 | * | 4/2003 | Foore et al. | 370/329 |
| 6,704,346 B1 | * | 3/2004 | Mansfield | 375/136 |
| 6,751,234 B1 | * | 6/2004 | Ono | 370/474 |
| 6,795,412 B1 | * | 9/2004 | Lee | 370/329 |
| 7,003,042 B2 | * | 2/2006 | Morelos-Zaragoza et al. | 375/253 |
| 2003/0093526 A1 | * | 5/2003 | Nandagopalan et al. | 709/225 |
| 2003/0152095 A1 | * | 8/2003 | Foore et al. | 370/412 |

FOREIGN PATENT DOCUMENTS

WO   WO 2005/062862 A2 * 7/2005

OTHER PUBLICATIONS

Link layer support for Quality of server on Wireless Internet links, Xylemenos, G. et. al., IEEE Personal Communications, ISBN 1070-9916/99, Oct. 1999, p. 52-60.*

(Continued)

*Primary Examiner*—Beatriz Prieto
(74) *Attorney, Agent, or Firm*—Alston & Bird LLP

(57) ABSTRACT

Apparatus, and an associated method, for facilitating communication of data in a packet radio communication system to effectuate a packet communication service in which packet data is communicated at a variable, selectable rate. A detector embodied at an RLP layer detects channel allocations and channel reaollcations, granted to the mobile station to effectuate the data communication service. A report is generated at the RLP layer and forwarded to the TCP layer. At the TCP layer, selection is made of the TCP window to match the rate at which data is provided to the RLP layer to the rate, based upon the channel allocations provided to the mobile station, at which the data is communicated therefrom.

20 Claims, 4 Drawing Sheets

OTHER PUBLICATIONS

An adaptive algorithm fo optimizing the packet size used in wireless ARQ protocols, Modiano, Eytan, J.C. Baltzer AG, Wireless Networks, Science Publishers,1999, p. 279-286.*

WTCP: a reliable transport protocol for wireless wide-area networks,P. Sinha, N. Venkitaraman, R. Sivakumar and V. Bharghavan, MobiCom'99, Aug. 1999, p. 301-316.□□ □□□□ □□.*

Title={{GPRS-Features and Packet Random Access Channel Performance Analysis}}, author={Gyasi-Agyei, A. and Halme, SJ and Sarker, JH}, journal={Proceedings of the 8th IEEE International Conference on Networks}, pp. 13, year={2000}.*

Title={{Overview of the GSM system and protocol architecture}}, author={Rahnema, M.}, journal={Communications Magazine, IEEE}, vol. 31, No. 4, pp. 92-100, year={1993}.*

Title={{The TD-CDMA based UTRA TDD mode}}, author={Haardt, M. and Klein, A. and Koehn, R. and Oestreich, S. and Purat, M. and Sommer, V. and Ulrich, T.}, journal={Selected Areas in Communications, IEEE Journal on}, vol. 18, No. 8, pp. 1375-1385, year={2000}.*

Title={{Interactions between TCP and RLP in wireless Internet}}, author={Wu, G. and Bai, Y. and Lai, J. and Ogielski, A.}, journal={1999 IEEE Global Telecommunication Conference—GLOBECOM'99}, pp. 661-666, year={1999}□□.*

Title={{Research Activities on UMTS Radio Interface, Network Architectures, and Planning}}, author=}Mohr, W. and Siemens, AG}, journal={IEEE Communications Magazine}, pp. 82-95, year={1998}.*

Title={{Resource allocation with adaptive QoS for multimedia transmissionover W-CDMA channels}}, author={Zhang, Q. and Zhu, W. and Wang, G.J. and Zhang, Y.Q.}, journal={Wireless Communications and Networking Conference, 2000. WCNC. 2000 IEEE}, vol. 1, year={2000}.*

\* cited by examiner

102

104

DETECT CHANNEL
ALLOCATIONS AT
THE MID-STACK LAYER

106

REPORT AT LEAST
CHANGES OF CHANNEL
ALLOCATIONS TO
UPPER-LEVEL LAYER

FIG. 4

APPARATUS, AND ASSOCIATED METHOD, FOR FACILITATING COMMUNICATION OF PACKET DATA IN A PACKET RADIO COMMUNICATION SYSTEM USING INTERACTIONS BETWEEN MID-STACK AND UPPER-LEVEL LAYERS

The present invention relates generally to a manner by which efficiently to communicate packet formatted data in a packet radio communication system in which data is formatted at two or more logical layers, such as a TCP (Transport Control Protocol) layer positioned above an RLP (Radio Link Protocol) layer. More particularly, the present invention relates to apparatus, and an associated method, by which to alert an upper level logical layer of changes in loading, or other communication, conditions detectable at a lower level logical layer, thereby to permit the upper level logical layer to alter the amount, or rate, at which data is provided to the lower level logical layer.

Spurious communication timeouts are reduced as the upper level logical layer is made aware of the changing conditions, known at the lower level logical layer. And, the upper level logical layer provides data to the lower level logical layer at a rate appropriate to the communication conditions. When, for instance, supplemental channel (SCH) allocation to effectuate a data communication service in a CDMA2000 cellular communication system changes, the changed allocation is reported by the RLP layer to the TCP layer. And, the TCP window is altered, thereby to alter the amount of data provided by the TCP layer to the RLP layer within a designated time interval.

BACKGROUND OF THE INVENTION

The need to communicate is a regular aspect of many facets of modern society. Access to communication systems through which data is communicated is needed by many to provide and to receive conventional communication services. And, as advancements in communication technologies continue, new communication services, effectuated by improved communication systems, are likely to become available.

A communication system is formed of a set of communication stations including at least one sending station and at least one receiving station that are interconnected by way of a communication channel. Data sourced at a sending station is communicated upon a communication channel to a receiving station. If necessary, the sending station converts the data into a form to permit its communication upon the communication channel, and the receiving station converts the data received thereat into a form to permit the recovery of the informational content thereof.

A radio communication system is an exemplary type of communication system. The communication channel utilized upon which to communicate data between sending and receiving stations of a radio communication system is formed of a radio channel defined upon a radio air interface, a portion of the electromagnetic spectrum. Communication channels are otherwise generally defined in other communication systems upon conductive paths, i.e., wirelines, that interconnect the communication stations. By utilizing radio channels rather than channels formed upon wirelines, the wirelines that are otherwise required to interconnect the communication stations are obviated.

Because a wireline connection is not required to interconnect communication stations to communicate data therebetween, communication services are effectable by way of a radio communication system when wireline connections interconnecting the locations at which the communication stations are positioned is not possible. Additionally, a radio communication system is available for implementation as a mobile communication system in which one or more of the communication stations is permitted mobility.

A cellular communication system is a mobile communication system. The networks of various cellular communication systems have been installed throughout significant portions of the populated areas of the world. Cellular communication systems are used to communicate telephonically to effectuate both voice and data communication services.

A user communicates by way of a cellular communication system through use of a mobile station. A mobile station is a radio transceiver that transceives data-containing communication signals with fixed-site transceivers that form parts of the network of the communication system. More generally, a mobile station, sometimes in conjunction with an additional device, is referred to as user equipment (UE). The fixed-site transceivers are referred to as base stations. The base stations are installed at spaced-apart locations throughout the geographical areas encompassed by the network of the communication system. The base stations each define a cell that represents a coverage area encompassed by the base station that defines the cell.

Communications by a mobile station, when positioned within a cell defined by a particular base station, generally communicates with that base station. Due to the inherent mobility of a mobile station, the mobile station might travel between cells defined by successive ones of the base stations. Continued communications with the mobile station are permitted through the effectuation of communication handoffs between successive ones of the base stations associated with the cells through which the mobile station passes.

First-installed cellular communication systems, referred to as first-generation systems, utilize analog communication techniques. So-called second-generation communication systems utilize digital communication techniques and provide limited data communication services. And, third-generation systems, are presently undergoing deployment. Third-generation systems provide for high-speed, variable rate data communication services.

An exemplary third-generation cellular communication system operates pursuant to the operating protocol set forth in a CDMA2000 operating specification. Packet-based communication services, and the operating protocols for effectuating such services, are set forth in the operating specification.

Various technology proposals by which to effectuate communication of packet data at high data rates in a CDMA2000 system have been proposed. The 1×EV-DV data communication service is one such proposal. Other data communication services are also proposed. Channels defined in a CDMA2000 system, as well as other code-division, multiple-access systems, are based upon codes by which communication data is coded. The code forms a spreading code that spreads data that is to be communicated from a low data rate to a spreading rate of 1.2288 Mcps. Codes assigned to communicate different concurrently-communicated data are orthogonal to one another to provide channel separation.

High data rate channels permit data to be communicated at high data rates and use proportionally more power for their transmission. Generally, this is achieved through the assignation of multiple orthogonal codes to a single communication session so that the throughput is the sum of all the related orthogonal channels assigned to the communication session. The number of orthogonal codes that are available by which to code data is limited. As the number of communication sessions increases, assignment of the codes must be controlled to allocate communication resources in a desired manner. Assignment of multiple orthogonal codes maps to so-called, 2×, 4×, 8×, or 16× supplemental channel assignments upon which high data rate communication services are effectuated.

When a cell is relatively unloaded, a communication allocation can be granted to a mobile station to effectuate the communication service at a high rate, such as through allocation of a 16× supplemental channel upon which to communicate the data to effectuate the communication service. When such a grant is made, an RLP (Radio Link Protocol) logical layer is permitted to send increased amounts of data on the radio air interface extending between the mobile station and the base station. And, accordingly, the TCP-layer (Transport Control Protocol-layer) window size is correspondingly sized.

However, in the event that loading conditions in the cell increase, i.e., the 16× supplemental channel assignment is reduced, e.g., to a 2× supplemental channel assignment. Reduced amount of data is communicated at the RLP layer. However, conventionally, the TCP layer is not made aware of the changed allocation. And, the TCP layer remains at a correspondingly large window size, and TCP-layer data is attempted to be communicated at the higher rate. TCP layer timeouts occur as a result. But, such timeouts are essentially spurious as the data is not actually sent out at the RLP layer. Analogous problems occur as a result of changing FER (Frame Error Rate) conditions that result in lower supplemental channel assignments. The spurious timeouts adversely affect the efficiency at which the data is communicated and the time period required to complete the communication service.

If a manner could be provided by which to reduce the occurrence of spurious timeouts, as a result of changes in loading conditions, improved communications would result.

It is in light of this background information related to communications in a packet radio communication system that the significant improvements of the present invention have evolved.

SUMMARY OF THE INVENTION

The present invention, accordingly, advantageously provides apparatus, and an associated method, by which efficiently to communicate packet formatted data in a packet radio communication system in which data is formatted at two or more logical layers, such as a transport control protocol (TCP) layer positioned above a radio link protocol (RLP) layer.

Through operation of an embodiment of the present invention, a manner is provided by which to alert the TCP, or other upper-level logical layer of changes in loading, or other communication, conditions detectable at the RLP, or other lower-level, logical layer, thereby to permit the amount, or rate, at which data is provided by the upper logical layer to the lower logical layer.

Because the data provided by the upper level layer to the lower level layer is provided at a rate better matched to the rate at which the data is communicated by a communication station upon a radio link, spurious communication timeouts at the upper level logical layer are less likely to occur.

The lower level logical layer is notified, or otherwise alerted, to the channel allocation of channel capacity upon which to communicate data at the lower level logical layer. Responsive to notification of the lower layer logical level of the communication allocation, the lower level logical layer generates an indication of the allocation and provides the indication to the upper level logical layer.

The upper level logical layer includes a detector for detecting the indication generated at the lower level logical layer and, responsive thereto, changes are made at the upper level logical layer of the amount, or rate, at which data is provided to the lower level logical layer to be communicated therefrom. Thereby, the upper level logical layer is made aware of the communication allocations available at the lower level logical layer upon which to communicate data. Improved communication efficiency results as the data formed at the upper level logical layer is applied to the lower level logical layer at a rate that matches the capability of the data to be communicated from the lower level logical layer.

When the communication station forms a mobile station operable in a CDMA2000, or other, communication system in which data services are provided at a selectable, variable rate, improved communications are possible. When data is to be communicated by the mobile station, the mobile station generates a request of the network for channel capacity upon which to communicate the data. Depending upon, e.g., loading conditions, the network grants channel allocations to the mobile station to communicate the data. When the communication conditions are relatively unloaded, the allocation granted to the mobile station is relatively large. And, conversely, during relatively high loading conditions in the network, a correspondingly smaller allocation is granted to the mobile station.

The channel allocations are dynamic; that is to say, the allocations are changeable as loading conditions at the network change. For instance, if a request for allocation is made when network conditions are relatively unloaded, a relatively large allocation is granted to the mobile station. But, during effectuation of the communication of the data, the loading conditions change, and the allocation to the mobile station is susceptible to decrease. If the allocation is decreased, the rate at which data is communicated by the mobile station is correspondingly reduced. The allocations and reallocations are provided to an RLP logical layer of the mobile station.

A detector is functionally operable to detect the allocations and reallocations granted by the network. And, responsive to the detections, the RLP layer also includes an indication generator functionally operable to generate an indication that is provided to the TCP layer of the mobile station to alert the TCP layer of the allocation, or its change. A detector functionally embodied at the TCP layer detects the indications provided thereto by the RLP layer. And, responsive to detection of the indications, the size of the TCP window that is determinative of the amount or rate at which data is provided by the TCP layer to the RLP layer is correspondingly altered. By matching the amount of, and the rate at which, data is delivered to the RLP layer from the TCP layer, with the rate at which data is able to be communicated by the RLP layer, spurious timeouts are less likely to occur.

In these and other aspects, therefore, apparatus, and an associated method, is provided for a communication station operable in a packet communication system to communicate packet data. The communication station is defined in terms of logical layers having at least one mid-stack layer and at least one upper-level layer positioned thereabove. Communication of the packet data is facilitated. A detector is embodied at the mid-stack layer. The detector detects channel allocations allocated to the communication station to communicate the packet data. And, a reporter is embodied at the mid-stack layer and coupled to the detector. The reporter reports at least changes of the channel allocations detected by the detector to the upper level layer.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 4 illustrates a method flow diagram listing the method steps of the method of operation of an embodiment of the present invention.

DETAILED DESCRIPTION

Figure 1:
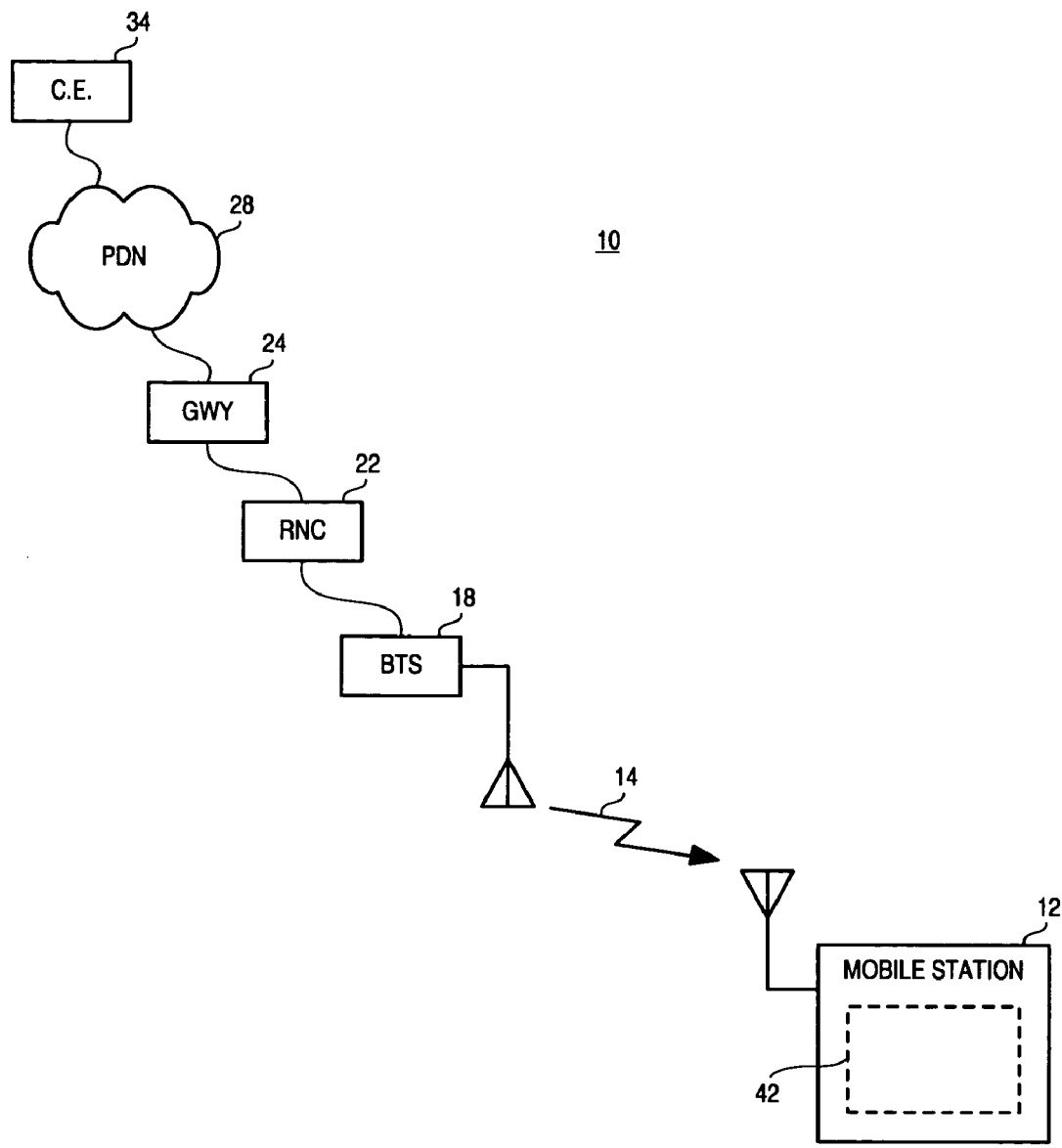
FIG. 1 illustrates a functional block diagram of an exemplary radio communication system in which an embodiment of the present invention is embodied.

Referring first to FIG. 1, a radio communication system, shown generally at 10, provides for the effectuation of radio communication services. Communication services are provided by, and to, mobile stations, of which a single mobile station 12 is shown in FIG. 1. In the exemplary implementation, the radio communication system forms a cellular communication system operable generally pursuant to the operating protocols defined in a CDMA2000 operating specification.

The communication system provides for high data rate communication services, e.g., pursuant to an 1×RTT communication scheme or pursuant to a 1×EV-DV communication scheme. Each of such communication schemes provides for communication of data at high, and selectable, data rates.

While the following description of operation of an exemplary embodiment of the present invention shall describe its implementation in a CDMA2000-compliant, cellular communication system that provides for the high data rate communication services, the teachings of the present invention are implementable in other cellular, and other, communication systems.

The mobile station 12 communicates by way of radio communication channels formed between the mobile station and a network part of the communication system. The radio channels are defined upon the radio air interface formed upon the frequency bandwidth allocated for radio communications in the CDMA2000 communication system by appropriate regulatory bodies. The arrow 14 is here representative of radio channels defined upon the radio air interface. Various signaling and traffic channels are defined upon the radio air interface, of characteristics and used for purposes, set forth in the CDMA operating specification. Forward-link channels are defined upon which to communicate data originated at the network part of the communication system to the mobile station.

Various functional entities of the network of the radio communication system are shown in the figure. An exemplary base transceiver station (BTS) forms part of the network of the radio communication system. The base transceiver station comprises radio transceiver circuitry for transceiving data communicated on forward- and reverse-link channels defined upon the radio air interface.

The base transceiver station defines a coverage area, referred to as a cell. When a mobile station, such as the mobile station 12, is positioned within the cell defined by a particular base transceiver station, such as the base transceiver station 18, the mobile station generally communicates with the base transceiver station in whose cell that the mobile station is positioned. As the mobile station travels through successive cells defined by successive base transceiver stations, handoff procedures are performed to permit continued communications with the mobile station with successive ones of the base transceiver stations.

The base transceiver station is coupled to a control device, here a radio network controller (RNC) 22. The radio network controller controls operation of base transceiver stations, such as the base transceiver station 18, including communication operations during which the base transceiver station communicates with mobile stations within its coverage area. The radio network controller, in turn, is coupled to a radio gateway (GWY) 24.

The gateway connects radio-network entities, here formed of the radio network controller and base transceiver station, with an external network. Here, the external network forms a packet data network (PDN) 28. Correspondent entities, such as the correspondent entity (CE) 34, are coupled to the packet data network. The correspondent entity 34 is representative of a correspondent node forming a data source or data sink at which data is sourced or terminated during a communication session with the mobile station 12.

The data communicated between the correspondent entity and the mobile station comprises, for instance, data communicated pursuant to a high data rate communication service, such as a 1×EV-DV data communication service or a 1×RTT data communication service. A data communication service is initiated by either a correspondent entity or by a mobile station. Here, for instance, a data communication service is initiated by the mobile station 12 for delivery to the correspondent entity 34.

When the data communication service is to be initiated, the mobile station sends a request to the network part of the communication system to request allocation of communication capacity on the radio air interface to permit the data to be communicated thereon to effectuate the data communication service. While communication capacity must be available in the network by which to route the data therethrough to deliver the data to the correspondent entity, bandwidth limitations are not regularly as severe at the network part of the communication system, and allocation of communication capacity therein is less problematical than the allocation of communication capacity by way of the radio air interface.

Communication capacity allocation allocated to the mobile station to effectuate the communication of the data pursuant to the high data rate communication service is dependent on various factors, including the loading in the cell. That is to say, other communications in the cell or reservations for communication capacity for other mobile stations pursuant to other communication sessions, are at least in part determinative of the allocations that are made to a particular mobile station to effectuate a data communication service. Additionally, loading conditions in a cell are not constant and dynamically change. As loading conditions change, communication capacity available to effectuate the data communication service also change.

In a CDMA2000 communication system, a supplemental channel is defined. And, 2×, 4×, 8×, and 16× SCH (Supplemental Channel) allocations are made, depending upon loading conditions in the cell when the request is made. And, after an allocation is made, reallocations are made, if needed, as a result of changing loading conditions.

Conventionally, communication capacity reallocations are made known to a RLP (Radio Link Protocol) layer of the mobile station. But, indications of reallocation of the communication capacity are not delivered by the RLP layer to layers positioned thereabove, such as the TCP layer. As a result, the upper level logical layers are not made aware of changes in communication capacity available to the mobile station to communicate data to effectuate the data communication service. And, the upper level logical layers continue to provide data at a rate corresponding to an earlier-allocated level of communication resources to the RLP layer. Because the RLP layer, however, communicates the data at a rate corresponding to the allocated communication capacity, data back-ups result in the event that the allocated communication capacity is decreased. Spurious timeouts at the TCP layer occur as a retransmission of a complete congestion window size of data into the network occurs.

The mobile station 12 further includes apparatus 42 of an embodiment of the present invention that, through its operation, facilitates a reduction in the number of spurious timeouts that occur as a result of changes in communication allocations to the mobile station during effectuation of the communication service. The apparatus 42 detects, or otherwise is made aware of, the allocations of communication resources provided to the mobile station to effectuate a communication service. Changes in such allocations are also detected or made known. In turn, notification is made to the TCP or other upper level logical layer of the change in allocation of communication capacity allocated to the mobile station to effectuate the data communication service. And, responsive thereto, changes are made at the upper level logical layer in the rate at which data is provided to the RLP layer. As the detections are dynamically made and the reports of the changes to the allocations are dynamically made to the upper level logical layer, dynamic changes in the rate at which the data is provided from the upper level logical layer to the lower level logical layer is possible. Spurious timeouts are less likely to occur, and improved communications result.

Figure 2:
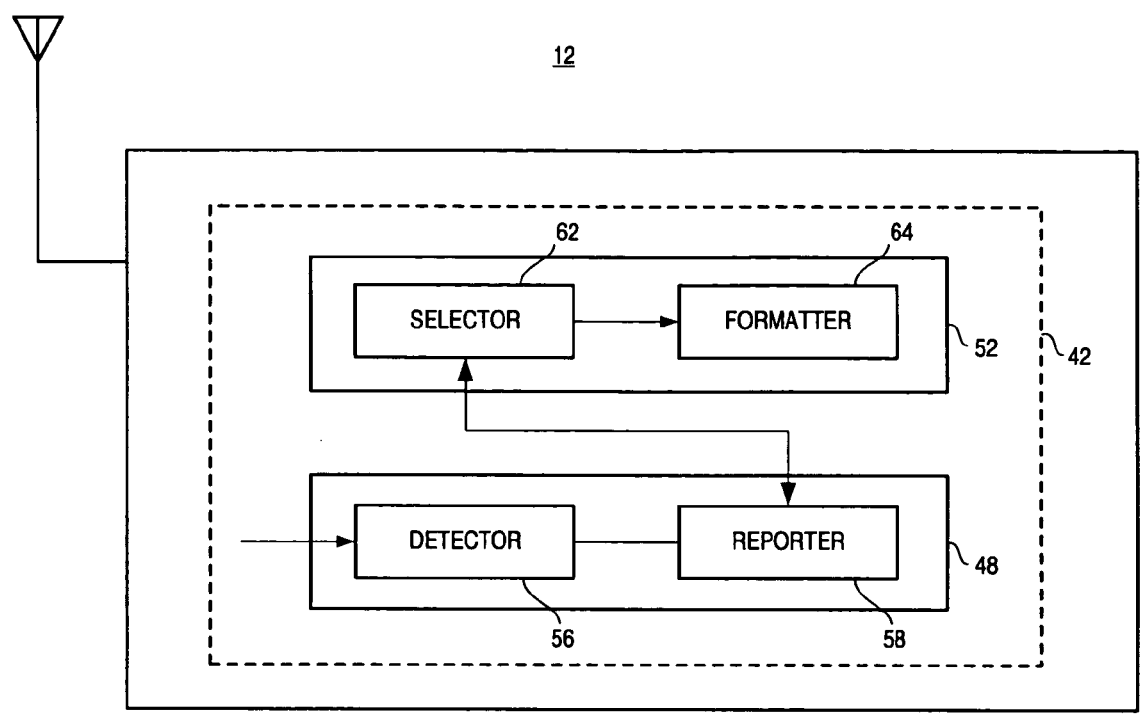
FIG. 2 illustrates a logical layer representation of a portion of the radio communication system shown in FIG. 1 including the functional entities that form an embodiment of the present invention.

FIG. 2 again illustrates the mobile station 12 that forms a portion of the radio communication system 10 shown in FIG. 1. Here, the mobile station is represented in logical layer form. That is to say, the mobile station is here shown to include an RLP (Radio Link Protocol) layer 48 and a TCP (Transport Control Protocol) layer 52 positioned thereabove. Logical layers formed beneath and above the RLP and TCP layers, respectively, are not separately illustrated, for purposes of simplicity. The apparatus 42 is also again shown. Here, the apparatus 42 is shown to be formed of functional entities, implemented at one of the RLP and TCP layers. The functions provided by such functional entities are implementable in any desired manner, such as by algorithms executable by processing circuitry.

Here, the apparatus includes a detector 56. The detector 56 operates to detect grants of communication capacity allocations to the mobile station to communicate by way of radio channels, here reverse-link channels with the network part of the communication system. And, as reallocations of the channel capacity are made, the detector also detects such reallocations. The RLP layer, a mid-stack layer, also includes a reporter 58. The reporter is coupled to receive indications of detections made by the detector. The reporter generates a report that is communicated to the TCP layer 52. And, the TCP layer includes a selector 62 that operates to select the packet sizes of TCP-formatted packets formed at the TCP layer. As channel allocations change, the detector detects the changes, and the reporter generates indications of the changes. Responsive thereto, the selector 62 operates to alter its selection of the packet sizes of the TCP-formatted packets that are to be formed at the TCP layer and provided to the RLP layer.

Here, additionally, the apparatus includes a TCP packet formatter 64 that is coupled to the selector 62 to receive indications of the packet size selections made thereat.

Thereby, through operation of the apparatus 42, changes in load conditions are deduced at the RLP layer based upon, e.g., detection of supplemental channel assignment changes. And, the detected changes are passed on to the TCP layer. Once delivered to the TCP layer, the sending window of the TCP layer is adjusted to be in accordance with the supplemental channel allocation. Analogous operation is performed when the supplemental channel assignments are changed due to changing FER (Frame Error Rate) conditions.

In other words, the interface between the TCP and RLP layers at the mobile station, or other sending station, is enhanced. When the RLP layer receives supplemental channel assignments that result in changes to the supplemental channel assignments or the supplemental channel being taken away, the RLP layer sends the indications to the TCP layer over the enhanced interface. The TCP layer then adjusts the window size such that proportionately lesser amounts of data are sent over to the RLP layer.

Figure 3:
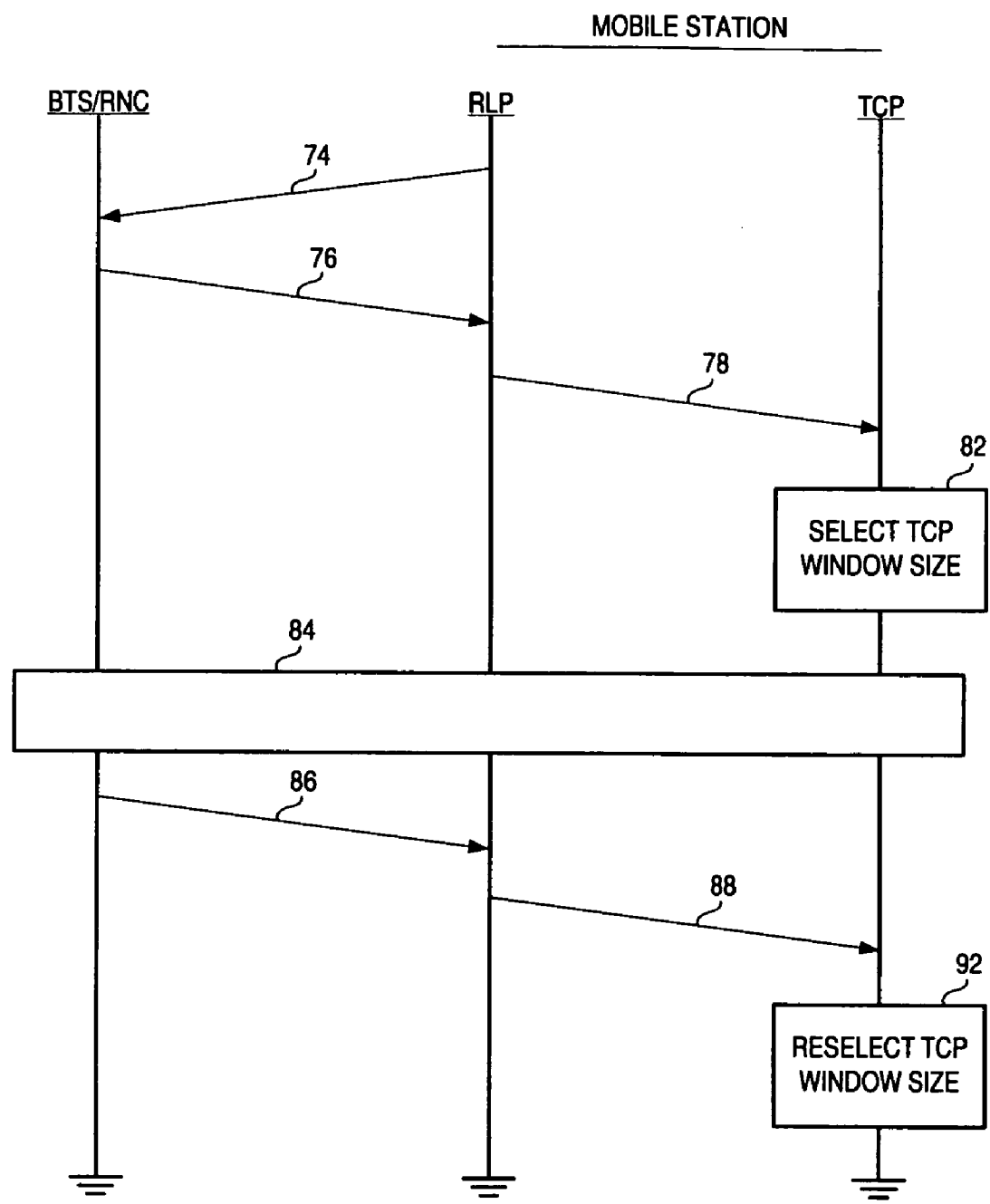
FIG. 3 illustrates a message sequence diagram representative of signaling generated during operation of an embodiment of the present invention.

FIG. 3 illustrates a message sequence diagram, shown generally at 72, representative of signaling generated during operation of the radio communication system shown in FIG. 1. First, and as indicated by the segment 74, when a communication service is to be effectuated by the mobile station, the mobile station generates a request for channel capacity allocation to the network, here represented by the base transceiver station/radio network controller 18/22. And, responsive to the request for channel allocation, an allocation grant is generated, and returned, indicated by the segment 76 to the RLP layer of the mobile station. Detection is made at the RLP layer and a report is generated and provided, here indicated by the segment 78, to the TCP layer. When delivered to the TCP layer, a TCP window size is selected, indicated by the block 82. And, effectuation of the communication service commences, here indicated by the block 84.

Subsequently, in the event that loading conditions change, the network reallocates the communication capacity allocated to the mobile station and notifies the mobile station, here indicated by the segment 86, of the changed allocation. In turn, the RLP layer of the mobile station forms a report and provides the report, indicated by the segment 88, to the TCP layer. At the TCP layer, the TCP window size is reselected, indicated by the block 92, and communication operations continue. As the TCP window size is resized corresponding to the changed allocation of communication capacity granted to the mobile station, the rate at which data is provided by the TCP layer to the RLP layer is meshed with the communication capacity on the radio air interface upon which data is subsequently communicated. Spurious timeouts are less likely to occur.

FIG. 4 illustrates a method flow diagram 102 illustrating the method steps of the method of operation of an embodiment of the present invention. The method facilitates communication of packet data in a packet communication system by a communication station that includes a mid-stack logical layer and an upper-logical layer positioned thereabove.

First, and as indicated by the block 104, channel allocations allocated to the communication station to communicate packet data is detected at the mid-stack layer. Then, and as indicated by the block 106, a report is made to the upper level logical layer of at least changes of the channel allocations detected at the mid-stack logical layer. Thereafter, and as indicated by the block 108, selection is made at the upper level logical layer of desired packet sizes of packets that are to be delivered by the upper level logical layer to the mid-stack logical layer.

By better matching the upper level packet size, and rate at which data is provided to the mid-stack layer, spurious timeouts resulting from decreased channel allocations on a radio air interface upon which to communicate the data are less likely to occur.

The previous descriptions are of preferred examples for implementing the invention, and the scope of the invention should not necessarily be limited by this description. The scope of the present invention is defined by the following claims.

What is claimed is:

1. In a communication station operable in a packet communication system to communicate packet data, the communication station defined in terms of logical layers having at least one mid-stack layer and at least one upper-level layer positioned thereabove, an improvement of apparatus for facilitating communication of the packet data, said apparatus comprising:
a detector embodied at the mid-stack layer, said detector for detecting channel allocations allocated to the communication station to communicate the packet data; and
a reporter embodied at the mid-stack layer and coupled to said detector, said reporter for reporting at least changes of the channel allocations detected by said detector to the upper-level layer.

2. The apparatus of claim 1 wherein the packet data communicated during operation of the packet communication system comprises packet data originated at the communication station, wherein the packet data originated at the communication station is upper-level formatted into a selected packet size at the upper-level layer and provided to the mid-stack layer, and wherein reports made by said reporter to the upper-level layer are, at least in part, determinative of the selected packet size.

3. The apparatus of claim 2 further comprising a packet size selector embodied at the upper-level layer, said packet size selector adapted to receive the reports made by said reporter, and said packet size selector for selecting the selected packet size into which the packet data is formatted at the upper-level layer.

4. The apparatus of claim 3 wherein the selected packet size into which said packet size selector selects the packet data to be formatted is directly proportional, at least in a step-wise manner, to the channel allocation detected by said detector and reported by said reporter.

5. The apparatus of claim 4 wherein the selected packet size defines a window-size and wherein reports made by said reporter are determinative of the window size, the window-size of a greater length when the reports made by said reporter indicate the channel allocations to be of increasing allocation sizes.

6. The apparatus of claim 4 wherein the selected packet size defines a window size and wherein reports made by said reporter are determinative of the window size, the window size of a lesser length when the reports made by said reporter indicate the channel allocations to be of decreasing allocation sizes.

7. The apparatus of claim 1 wherein reports made by said reporter are of values representative of the channel allocations detected by said detector.

8. The apparatus of claim 1 wherein the channel allocations allocated to the communication station are dynamically re-allocable during communication of the packet data and wherein said detector further detects re-allocations of the channel allocations during the communication of the packet data.

9. The apparatus of claim 5 wherein reports made by said reporter are further made during the communication of the packet data.

10. The apparatus of claim 1 wherein the packet communication system comprises a packet radio communication system and wherein the at least one mid-stack layer comprises an RLP (Radio Link Protocol) layer, said detector and said reporter embodied at the RLP layer.

11. The apparatus of claim 10 wherein the at least one upper-level layer comprises a TCP (Transport Control Protocol) layer and wherein reports made by said reporter are made to the TCP layer.

12. The apparatus of claim 11 wherein the packet data communicated during operation of the packet radio communication system comprises packet data originated at the communication station, wherein the packet data originated at the communication station is TCP-formatted into a selected packet size at the TCP layer, and wherein reports made by said reporter to the TCP layer are, at least in part, determinative of the selected packet size of the TCP-formatted packet data.

13. The apparatus of claim 12 further comprising a TCP-packet size selector embodied at the TCP layer, said TCP-packet size selector adapted to receive reports made by said reporter and for selecting the packet size of TCP-formatted data formed at the TCP layer.

14. The apparatus of claim 13 further comprising a TCP packet formatter adapted to receive indications of selection made by said TCP-packet size selector, said TCP packet formatter for formatting the packet data responsive to the indications of the selections.

15. The apparatus of claim 1 wherein the packet communication system comprises a cellular communication system that provides CDMA (Code Division Multiple Access) packet data services at selectable data rates and wherein the channel allocations detected by said detector are of the data rates at which the data services are permitted to be performed.

16. A method for facilitating communication of packet data in packet communication system having a communication station, the communication station defined in terms of logical layers having at least one mid-stack layer and at least one upper-level layer positioned thereabove, said method comprising:

detecting at the mid-stack layer channel allocations allocated to the communication station to communicate the packet data; and reporting to the upper level layer at least changes of the channel allocations detected during said operation of detecting to the upper level layer.

17. The method of claim 16 further comprising the operation of selecting the packet size of packet data formed at the upper level layer based on the changes of the channel allocations reported.

18. The method of claim 17 further comprising the operation of formatting, at the upper level layer, the packet data of sizes responsive to selection made during said operation of selecting.

19. The method of claim 16 further comprising the operation, prior to said operation of detecting, of notifying the communication station of the channel allocation.

20. The method of claim 16 wherein the mid-stack layer comprises an RLP (Radio Link Protocol) layer and wherein said operations of detecting and reporting are performed at the RLP layer.

\* \* \* \* \*